United States Patent [19]

Auchter et al.

[11] Patent Number: 4,931,494

[45] Date of Patent: Jun. 5, 1990

[54] AQUEOUS POLYMER DISPERSIONS HAVING A LONG SHELF LIFE

[75] Inventors: Gerhard Auchter, Mannheim; Thomas Schwerzel, Ludwigshafen; Rolf Osterloh, Erftstadt; Gerhard Neubert, Battenberg; Peter Pfoehler, Speyer; Wolfgang Druschke, Dirmstein; Helmut Jaeger, Bobenheim, all of Fed. Rep. of Germany

[73] Assignee: BASF Aktiengesellschaft, Ludwigshafen, Fed. Rep. of Germany

[21] Appl. No.: 210,321

[22] Filed: Jun. 23, 1988

[30] Foreign Application Priority Data

Jun. 24, 1987 [DE] Fed. Rep. of Germany ....... 3720860

[51] Int. Cl.$^5$ ............................................. C08F 2/16
[52] U.S. Cl. .................................... 524/460; 524/517; 524/523; 524/522; 525/376
[58] Field of Search ............... 524/517, 522, 523, 460; 525/376

[56] References Cited

U.S. PATENT DOCUMENTS

| 4,210,565 | 7/1980 | Emmons | 524/560 |
| 4,250,070 | 2/1981 | Ley et al. | 524/555 |
| 4,384,069 | 5/1983 | Wendel et al. | 524/523 |
| 4,543,387 | 9/1985 | Padget et al. | 524/523 |

FOREIGN PATENT DOCUMENTS

| 0015644 | 9/1980 | European Pat. Off. . |
| 1421130 | 1/1973 | United Kingdom . |
| 1530021 | 10/1978 | United Kingdom . |

OTHER PUBLICATIONS

Patent Abstracts of Japan, vol. 6, No. 63 (C-99) (941) (4/22/82) European Search Reports.

*Primary Examiner*—Joseph L. Schofer
*Assistant Examiner*—J. M. Reddick
*Attorney, Agent, or Firm*—Keil & Weinkauf

[57] ABSTRACT

Aqueous polymer dispersions which have a long shelf life are obtainable by dispersing a mixture of from 15 to 70% by weight of a copolymer (A) of (I) from 1.5 to 15% by weight of copolymerizable compounds of 3 to 10 carbon atoms which contain a carboxyl or carboxylic anhydride group, (II) from 65 to 98.5% by weight of $C_1$–$C_{20}$-alkyl acrylates or methacrylates, (III) from 0 to 20% by weight of vinylaromatics, (IV) from 0 to 20% by weight of copolymerizable carbonyl compounds and (V) from 0 to 10% by weight of further copolymerizable organic compounds not stated under (I) to (IV), and from 30 to 85% by weight of a copolymer (B) of from 60 to 100% by weight of the monomers (II) and from 0 to 40% by weight of the monomers (III) to (V), with the proviso that the copolymers (A) and (B) together contain, as components, more than 65% by weight of alkyl (meth)acrylates (II) whose homopolymers have glass transition temperatures of less than 0° C., and that one or more of the copolymers (A) and (B) contain the monomers (IV) as components, in water with the addition of ammonia and a polyhydrazide (C), and the said dispersions are used as pressure sensitive adhesives and as adhesives for laminated films.

20 Claims, No Drawings

AQUEOUS POLYMER DISPERSIONS HAVING A LONG SHELF LIFE

The present invention relates to aqueous polymer dispersions which have a long shelf life and are obtainable by dispersing a mixture of two copolymers, one or both of which contain a copolymerizable carbonyl compound as a component, in the presence of polyhydrazides as crosslinking agents, a process for the preparation of such dispersions and their use as pressure sensitive adhesives and as adhesives for laminated films.

Aqueous dispersions which are used in the field of adhesives are usually emulsion polymers which are prepared using hydrophilic systems of assistants (emulsifiers and/or protective colloids). These hydrophilic assistants remain in the adhesive film after the dispersions have dried and have an adverse effect on its water resistance, which is therefore generally unsatisfactory. In particular, blooming of the adhesive films on contact with water is very troublesome for certain applications, for example the adhesive bonding of transparent films. Polymer dispersions of this type are described in, for example, European Pat. No. 3516.

German Laid-Open Application DOS 3,536,261 describes polymeric compositions which have a long shelf life in aqueous solutions or dispersions, are obtainable by reacting polymeric organic compounds containing carboxyl and carbonyl groups with polyhydrazides in the presence of monoketones and/or monoaldehydes and are soluble or dispersible in water after neutralization of some or all of the carboxyl groups. The dispersions prepared in this manner are referred to as secondary dispersions. In order to achieve an adequate shelf life, substantial amounts of volatile monoketones and/or monoaldehydes are required, which evaporate during drying. This is undesirable because of the odor and for toxicological reasons. Furthermore, owing to the relatively high content of carboxyl groups required for the preparation of these compositions, the water resistance of the films produced therefrom is not optimal.

It is an object of the present invention to provide aqueous polymer dispersions which have a long shelf life, contain only very small amounts of organic solvents, in particular no ketones or aldehydes, and give very water-resistant films having good adhesion and cohesion properties.

We have found that this object is achieved by aqueous polymer dispersions which have a long shelf life and which are obtainable by dispersing a mixture of from 15 to 70% by weight of a copolymer (A) of (I) from 1.5 to 15% by weight of copolymerizable compounds of 3 to 10 carbon atoms which contain a carboxyl or carboxylic anhydride group,
(II) from 65 to 98.5% by weight of $C_1$–$C_{20}$-alkyl acrylates or methacrylates,
(III) from 0 to 20% by weight of vinylaromatics,
(IV) from 0 to 20% by weight of copolymerizable carbonyl compounds and
(V) from 0 to 10% by weight of further copolymerizable organic compounds not stated under (I) to (IV), and from 30 to 85% by weight of a copolymer (B) of from 60 to 100% by weight of the monomers (II) and from 0 to 40% by weight of one or more of the monomers (III) to (V), with the proviso that the copolymers (A) and (B) together contain, as components, more than 65% by weight of alkyl (meth)acrylates (II) whose homopolymers have glass transition temperatures of less than 0° C., and that one or both of the copolymers (A) and (B) contain the monomers (IV) as components, in water with the addition of ammonia and a polyhydrazide (C).

The present invention furthermore relates to a process for the preparation of the aqueous polymer dispersions and their use as pressure sensitive adhesives and as adhesives for laminated films.

Regarding the components of the copolymers (A) and (B), the following may be stated:

Suitable components (I) are copolymerizable olefinically unsaturated organic compounds of 3 to 10 carbon atoms which contain one or more carboxyl or carboxylic anhydride groups, such as acrylic acid, methacrylic acid, maleic acid, itaconic acid and anhydrides and half-esters of the dicarboxylic acids. The anhydride groups of the copolymers can be converted into the corresponding half-ester groups prior to neutralization to ammonia, for example by heating with glycol ethers or alcohols of 1 to 8 carbon atoms. Examples of such alcohols and glycol ethers are ethanol, isopropanol, butanol and butylglycol. Preferred components (I) are acrylic acid, methacrylic acid and itaconic acid. Component (I) is present in copolymer (A) as copolymerized units in amounts of from 1.5 to 15, preferably from 5 to 12, % by weight.

Examples of suitable esters of acrylic acid or methacrylic acid (II) with straight-chain or branched monoalkanols of 1 to 20 carbon atoms are methyl acrylate, ethyl acrylate, isopropyl acrylate, methyl methacrylate, n-butyl acrylate, n-butyl methacrylate, isobutyl acrylate, isobutyl methacrylate, tert-butyl acrylate, 2-ethylhexyl acrylate, 2-ethylhexyl methacrylate, lauryl acrylate and mixtures of these. n-Butyl acrylate and methyl methacrylate are preferred.

Component (II) is present in copolymer (A) in an amount of from 65 to 98.5, preferably from 80 to 95, % by weight.

Vinylaromatics of 8 to 12 carbon atoms, such as styrene, methylstyrene, vinyltoluenes, tert-butylstyrene and halostyrenes, are used as component (III). Styrene is preferred. Component (III) can be present in copolymer (A) in an amount of up to 20% by weight. Where it is used, amounts of from 5 to 15% by weight have proven useful.

Examples of suitable copolymerizable carbonyl-containing compounds (IV) are $\alpha,\beta$-monoolefinically unsaturated aldehydes and/or ketones, such as acrolein, methacrolein, vinyl alkyl ketones where alkyl is of 1 to 20 carbon atoms, formylstyrene, (meth)acryloxyalkanals and -alkanones, whose prepartion is described in, for example, German Laid-Open Application DOS 2,722,097, N-oxoalkyl(meth)acrylamides, as described in, inter alia, U.S. Pat. No. 4,226,007 and German Laid-Open Applications DOS 2,061,213 and DOS 2,207,209, for example N-3-oxobutylacrylamide and -methacrylamide, N-1,1-dimethyl-3-oxobutyl(meth)acrylamide, diacetone(meth)acrylamide and N-3-oxo-1,1-dibutyl-2-propylhexylacrylamide, and acetonyl and diacetone (meth)acrylate and acrylaminopivalaldehyde and mixtures of these comonomers. 3-Oxoalkyl (meth)acrylates and N-3-oxoalkyl (meth)acrylamides are preferred.

Component (IV) can be present in copolymer (A) in an amount of up to 20% by weight. Where it is used, an amount of from 3 to 10% by weight is preferred.

Components (V) are further copolymerizable olefinically unsaturated compounds not mentioned under (I) to (IV). These are, for example, mono(meth)acrylates of alkanediols, such as hydroxyethyl and hydroxypropyl (meth)acrylate and butanediol mono(meth)acrylate, (meth)acrylamide and/or (meth)acrylonitrile. These monomers can, if required, be used for obtaining special properties. Other components (V) which may be present are: vinyl ethers, vinyl esters and diesters of maleic acid, itaconic acid, citraconic acid or mesaconic acid with monoalcohols of 1 to 20 carbon atoms which may contain ether or thioether groups. Other suitable components (V) are monoolefins of 3 to 20 carbon atoms, such as propene, butene, pentene, hexene or isobutene, and diolefins, such as butadiene and isoprene. It is known that polar functional groups such as those which may be present in component (V), e.g. hydroxyl or ether groups, additionally stabilize polymer dispersions. However, the novel dispersions do not require such additional stabilization. Polar groups present in component (V) can, however, have an adverse effect on the water resistance of the films obtained from the novel dispersions. In the preferred embodiment of the invention, component (V) is therefore not used.

Copolymer (B) does not contain component (I). Component (II) is present in copolymer (B) in an amount of from 60 to 100, preferably from 75 to 98, % by weight, and the remaining components (III) to (V) are present in amounts of from 0 to 40% by weight, preferably from 2 to 25% by weight where they are used.

The mixture of the copolymers consists of from 15 to 70, preferably from 25 to 45, % by weight of copolymer (A) and from 30 to 85, preferably from 55 to 75, % by weight of copolymer (B). In order that the polymer dispersions have good adhesive properties after film formation, more than 65% by weight, based on the total amount of the components (I) to (V) used for the preparation of the copolymers (A) and (B), of alkyl (meth)acrylates (II) whose homopolymers have glass transition temperatures of less than 0° C. are used. The glass transition temperatures of homopolymers are stated in, for example, J. Brandrup and E. H. Immergut, Polymer Handbook, Wiley-Interscience, 2nd Edition, 1975, III-139 et seq.

When the novel dispersions are used as adhesives, the glass transition temperature of the polymer and hence its hardness must be adapted to the relevant specific application by appropriate selection of the monomers. A dispersion which is used as a pressure sensitive adhesive should have a glass transition temperature of less than 0° C. The skilled worker is familiar with the fact that, in the case of acrylate dispersions, the grab increases with decreasing glass transition temperature. In general, good grab is associated with a glass transition temperature of less than −45° C. Dispersions having a glass transition temperature above −45° C. have substantially poorer grab at room temperature. The novel dispersions surprisingly have good grab even when the glass transition temperature is −25° C.

Furthermore, either copolymer (A) or copolymer (B) or both copolymers contains or contain components (IV) to permit crosslinking by means of the polyhydrazides.

The copolymers (A) and (B) of the novel dispersions are advantageously prepared by polymerization in organic solution. The process of solution polymerization is in principle familiar to the skilled worker so that the conditions suitable for the particular components need not be discussed in detail here. The polymerization is advantageously carried out in the presence of from 0.3 to 5.0, preferably from 0.5 to 3.0, % by weight, based on the sum of the monomers, of free radical initiators, such as azobiscarboxamides, azobiscarbonitriles or peroxides, in general at from 50° to 150° C., preferably from 80° to 130° C., in the presence or absence of regulators, such as mercaptoethanol, tert-dodecyl mercaptan or diisopropylxanthogen disulfide, which may be present in amounts of from 0 to 3% by weight, based on the sum of the monomers.

All conventional solvents which dissolve the novel copolymer are in principle suitable as the organic solvents. A solvent content is not essential for stabilizing novel dispersions and imparting advantageous performance characteristics to them and, for reasons of environmental protection, it is therefore useful to choose a very low solvent content. Advantageously used solvents are those which, because of their boiling point and/or azeotrope formation with water, can be readily distilled off from the novel dispersions. Butanol, isobutanol, propanol, ethanol and toluene are particularly preferred.

It is not important per se whether component (A) is polymerized first, followed by component (B), or whether the converse procedure is adopted. In a preferred embodiment of the invention, however, component (A) is first polymerized and then component (B). The two components give a homogeneous mixture. The component prepared first is very substantially, i.e. more than 95%, preferably 99%, polymerized before polymerization of the second component is begun. Residual monomers from the first component, in particular monomers containing acidic groups, could produce a change in the composition of the second component, leading to a deterioration in the performance characteristics.

Dispersions prepared similarly to those according to the invention from two copolymers (A) and (B) prepared separately and then mixed generally have more disadvantageous performance characteristics, such as poorer stability and unfavorable flow behavior. Furthermore, mixing would require an additional operation.

The solutions of the copolymers (A) and (B) are converted into dispersions by admixing ammonia and diluting with water, or the polymerized copolymer solution is slowly stirred into an aqueous ammonia solution and a dispersion is obtained in this manner. The organic solvent is removed from the resulting dispersions, if necessary by distillation, to a concentration of <5% by weight, and the solvent can be recovered. The degree of neutralization of the novel dispersion is from 10 to 150%, preferably from 15 to 100%, particularly preferably from 40 to 70%. The pH of the dispersions can accordingly be about 6.8-10, preferably 7-9. To achieve certain effects, a small proportion, advantageously not more than 25, preferably not more than 10, mol % of the ammonia required for neutralization can be replaced by organic amines, in particular triethylamine. Such additives may have an adverse effect on the water resistance of the dispersion films. The polymer content of the novel dispersions is advantageously chosen so that the resulting viscosity is advantageous for the processor. The polymer content is therefore from 35 to 60, preferably from 40 to 55, % by weight.

Examples of suitable polyhydrazides (C) are dihydrazides of organic di- or oligocarboxylic acids. Examples are malonic, succinic, glutaric, adipic, pimelic, suberic, azelaic, sebacic, undecannedioic, dodecanedioic, tridecanedioic, tetradecanedioic, pentadecanedioic, hexadecanedioic and 2-methyltetradecanedioic dihydrazide, methyl-, ethyl-, propyl-, butyl-, hexyl-, heptyl-, octyl-, 2-ethylhexyl-, nonyl-, decyl-, undecyl- and dodecylmalonic dihydrazide, methyl-, ethyl-, propyl-, butyl-, hexyl-, heptyl- and octylsuccinic dihydrazide, 2-ethyl-3-propylsuccinic and glutaric dihydrazide, cyclohexanedicarboxylic and cyclohexanemethanemalonic dihydrazide, terephthalic, phenylsuccinic, cinnamylmalonic and benzylmalonic dihydrazide, pentane-1,3,5-tricarboxylic trihydrazide, hex-4-ene-1,2,6-tricarboxylic trihydrazide, 3-cyanopentane-1,3,5-tricarboxylic trihydrazide, dicyanofumaric dihydrazide and the di- and oligohydrazides of dimerized and oligomerized unsaturated fatty acids.

Adipic dihydrazide is preferred.

The polyhydrazide is advantageously added to and stirred into the novel polymer dispersions after the excess organic solvent has been distilled off, in solid form or as an aqueous solution or suspension.

Despite the possible reaction between hydrazide and carbonyl groups which leads to crosslinking, the novel dispersions surprisingly have a long shelf life, i.e. they do not tend to form two phases even on prolonged storage, nor do the viscosity, film-forming behavior and tack change significantly during storage.

After application to a substrate and drying, however, crosslinked films are obtained at as low as room temperature and cannot be completely dissolved again. Drying and crosslinking are accelerated by elevated temperatures. The films obtainable from the novel dispersions are highly tacky even without the addition of hydrazide. For use as an adhesive, however, the cohesion is completely insufficient. The cohesion is gretly increased by the addition of hydrazide and thus adapted to the particular intended use. The preferred amount of added hydrazide corresponds to a ratio of equivalents of from 0.1 to 0.5, preferably from 0.2 to 0.4, based on the carbonyl component used. In general, the tack and the grab decrease with increasing amounts of added hydrazide, based on the carbonyl component, while the cohesion increases.

The water resistance of the dispersion films decreases slightly with increasing hydrazine content, based on the carbonyl component, but is still substantially higher than that of a normal soap dispersion or protective colloid dispersion even at a ratio of equivalents of 1, based on the carbonyl component. The water resistance is tested by measuring the decrease in light transmittance of a 20 μm thick dispersion film applied to a transparent polyester film and stored in water. The novel dispersions show a decrease of from 2 to 15% after 60 minutes, soap dispersions or protective colloid dispersions exhibiting a decrease of not less than 25%. The dispersions can be processed with a conventional coating unit, and the viscosity can be adapted to the particular coating system by thickening with commercial thickeners or diluting with water.

EXAMPLES 1 TO 6

Mixture 1 (cf. Table 1) together with 260 g of isobutanol was initially taken in a reaction vessel and heated to 105° C. Thereafter, mixture 2 was added and polymerization was carried out for 2.5 hours at the reflux temperature. Mixture 3 was then metered in at about 105° C. in the course of 3 hours. Polymerization was then continued for a further 4 hours at 105° C. and the mixture was diluted with 200 g of isobutanol. After the mixture had cooled to 60° C., 35.4 g of 25% strength by weight aqueous ammonia solution were stirred in, followed by 850 g of water. An isobutanol/water mixture was distilled off under reduced pressure until virtually no more isobutanol passed over. During the distillation, an amount of water corresponding to the amount of liquid distilled off was added. The amount of adipic dihydrazide stated in Table 1 was then stirred in and the mixture was diluted with water to the stated solids content.

TABLE 1

| | Example 1 | Example 2 | Example 3 | Example 4 | Example 5 | Example 6 |
|---|---|---|---|---|---|---|
| Mixture 1: | | | | | | |
| methyl methacrylate (g) | 70 | 85 | 105 | 40 | 85 | 85 |
| n-butyl acrylate (g) | 320 | 402.5 | 480 | 447.5 | 402.5 | 402.5 |
| acrylic acid (g) | 30 | 37.5 | 45 | 37.5 | 37.5 | 37.5 |
| Mixture 2: | | | | | | |
| tert-butyl perbenzoate (g) | 1.5 | 2.3 | 2.2 | 2.3 | 2.3 | 2.3 |
| tert-butyl peroctoate (g) | 1.5 | 2.3 | 2.2 | 2.3 | 2.3 | 2.3 |
| isobutanol (g) | 30 | 40 | 40 | 40 | 40 | 40 |
| Mixture 3: | | | | | | |
| methyl methacrylate (g) | 155 | 140 | 120 | 72.5 | 162.5 | 117.5 |
| n-butyl acrylate (g) | 880 | 790 | 705 | 857.5 | 790 | 790 |
| diacetone acrylamide (g) | 45 | 45 | 45 | 45 | 22.5 | 67.5 |
| tert-butyl perbenzoate (g) | 7.5 | 6.7 | 6.8 | 6.7 | 6.7 | 6.7 |
| tert-butyl peroctoate (g) | 4.5 | 6.7 | 3.8 | 6.7 | 6.7 | 6.7 |
| isobutanol (g) | 150 | 140 | 140 | 140 | 140 | 140 |
| adipic dihydrazide (g) | 11.6 | 11.6 | 11.6 | 9.3 | 5.8 | 17.4 |
| Solids content of the dispersion (% by weight) | 51.2 | 51.9 | 42.3 | 48.9 | 41.5 | 46.8 |
| iobutanol content (% by weight) | 1.8 | 1.8 | 1.1 | 0.9 | 1.4 | 1.9 |
| pH | 8.3 | 8.1 | 8.2 | 8.2 | 8.4 | 8.3 |
| Viscosity (mPa.s) | 350 | 420 | 2600 | 120 | 3200 | 1300 |

Testing the dispersions

For testing the adhesion, the dispersions were dried on polyester film for 3 minutes at 90° C. in a drying oven so that the dry film had a thickness corresponding to 25 g/m². The resulting adhesive films were cut into 2 cm wide strips. To determine the cohesion, the adhesive strips were bonded to a chromium-plated V2A steel test sheet over a length of 2.5 cm, stored for 24 hours and then subjected to the load from a suspended 1 kg weight. A measure of the cohesion is the time taken for the weight to drop. The mean of five measurements was used. In this test, the adhesive film should as far as possible be destroyed (breakdown of cohesion).

In determining the peeling strength, the adhesive strip was peeled off backward from a chromium-plated test sheet in a tensile test apparatus at 23° C., at an angle of 180° and at a speed of 300 mm/minute. The force in N determined as the mean value of five tests for the 2 cm wide strips was stated as a measure of the peeling strength. The adhesive film should as far as possible remain intact in the peeling test and should be completely detached from the substrate (breakdown of adhesion).

To determine the water resistance, the dispersion was applied as described above to a transparent polyester film by knife-coating and was dried. The film was clamped in a frame, which was immersed in the water-filled cell of an apparatus for determining the light transmittance. Immediately after immersion, the apparatus was calibrated for light transmittance (=100%) and the time-dependent decrease in the light transmittance was then recorded. The test values for Examples 1 to 6 are summarized in Table 2.

TABLE 2

|  | Example 1 | Example 2 | Example 3 | Example 4 | Example 5 | Example 6 |
| --- | --- | --- | --- | --- | --- | --- |
| Cohesion at 25° C. (hours) | >120 | >120 | >120 | 9.5 | >120 | 40 |
| Cohesion at 50° C. (hours) | 3 | 13.5 | 21 | 1.4 | >120 | 2.5 |
| Peeling strength (N) | 5.3 | 7.5 | 4.4 | 8.6 | 4.5 | 9.2 |
| Light transmittance after 0.5 hour (%) | 88 | 98 | 92 | 85 | 96 | 93 |

We claim:

1. An aqueous polymer dispersion which has a long shelf life and which comprises a mixture containing: of from 15 to 70% by weight of a copolymer (A) having as components:
(I) from 1.5 to 15% by weight of copolymerizable compounds of 3 to 10 carbon atoms which contain in carboxyl or carboxylic anhydride group;
(II) from 65 to 98.5% by weight of $C_1$-$C_{20}$-alkyl acrylates or methacrylates;
(III) from 0 to 20% by weight of vinylaromatics;
(IV) from 0 to 20% by weight of copolymerizable carbonyl compounds selected from the group consisting of aldehydes, ketones and mixtures thereof; and
(V) from 0 to 10% by weight of further copolymerizable organic compounds not stated under (I) to (IV); and
from 30 to 85% by weight of a copolymer (B) having as components: from 60 to 100% by weight of the monomers (II); and from 0 to 40% by weight of one or more of the monomers (III) to (V), wherein the copolymers (A) and (B) are dispersed in water with ammonia and a polyhydrazide (C) and together contain more than 65% by weight of alkyl (meth)acrylates (II) whose homopolymers have glass transition temperatures of less than 0° C., and wherein one or both of the copolymers (A) and (B) contain the monomer(s) (IV) as components.

2. A process for preparing an aqueous polymer dispersion, which comprises forming, in an organic solvent, a mixture containing: from 15 to 70% by weight of a copolymer (A) having as components:
(I) from 1.5 to 15% by weight of copolymerizable compounds of 3 to 10 carbon atoms which contain a carboxyl or carboxylic anhydride group;
(II) from 65 to 98.5% by weight of $C_1$-$C_{20}$-alkyl acrylates or methacrylates;
(III) from 0 to 20% by weight of vinylaromatics;
(IV) from 0 to 20% by weight of copolymerizable carbonyl compounds selected from the group consisting of aldehydes, ketones and mixtures thereof;
(V) from 0 to 10% by weight of further copolymerizable organic compounds not stated under (I) to (IV); and
from 30 to 85% by weight of a copolymer (B) having as components from 60 to 100% by weight of the monomers (II) and from 0 to 40% by weight of one or more of the monomers (III) to (V), wherein the copolymers (A) and (B) together contain more than 65% by weight of alkyl (meth)acrylates (II) whose homopolymers have glass transition temperatures of less than 0° C., and one or both of the copolymers (A) and (B) contain the monomers (IV) as components, and wherein, one of the two copolymers (A) and (B) is first prepared by polymerization of its components, the other copolymer is produced in a polymer solution of the first prepared copolymer, the mixture containing copolymers (A) and (B) is then dispersed in water, with the addition of ammonia, and one or more polyhydrazides (C) are then added to the dispersed copolymer mixture.

3. A polymer dispersion as claimed in claim 1, obtained by using from 0.1 to 1 equivalent of polyhydrazide (C) per equivalent of carbonyl groups in the copolymer mixture (A) and (B).

4. The aqueous polymer dispersion of claim 1, wherein component (I) is acrylic, methacrylic or itaconic acid.

5. The aqueous polymer dispersion of claim 1, wherein component (I) is present in copolymer (A) at from 5 to 12% by weight.

6. The aqueous polymer dispersion of claim 1, wherein component (II) is present at from 80 to 95% by weight.

7. The aqueous polymer dispersion of claim 1, wherein component (III) is present in copolymer (A) at from 5 to 15% by weight.

8. The aqueous polymer dispersion of claim 1, wherein compound (IV) is a 3-Oxoalkyl (meth)acrylate or N-3-oxoalkyl (meth)acrylamide.

9. The aqueous polymer dispersion of claim 1, wherein component (IV) is present in copolymer (A) at from 3–10% by weight.

10. The aqueous polymer dispersion of claim 1, wherein component (II) is present in copolymer (B) at from 75 to 98% by weight.

11. The aqueous polymer dispersion of claim 1, wherein components (III) to (V) are present at from 2 to 25% by weight.

12. The aqueous polymer dispersion of claim 1, wherein copolymer (A) is present at from 25 to 45% by weight and copolymer (B) is present at from 55 to 75% by weight.

13. The aqueous polymer dispersion of claim 1, wherein component (C) is adipic dihydrazide.

14. The aqueous polymer dispersion of claim 1, wherein the following components are present in copolymer (A) in the following percentages by weight:
(a) component (I) at from 5 to 12%;
(b) component (II) at from 80 to 95%;
(c) component (III) at from 5 to 15%; and
(d) component (IV) at from 3 to 10%.

15. The aqueous polymer dispersion of claim 14, wherein component (I) is acrylic acid, methacrylic acid or itaconic acid, component (II) is n-Butyl acrylate or methyl methacrylate, component (III) is styrene, and component (IV) is a 3-Oxoalkyl (meth)-acrylate or a N-3-Oxoalkyl (meth)acrylamide.

16. The aqueous polymer dispersion of claim 15, wherein copolymer (B) contains component (II) at from 75 to 98% by weight and components (III–V) are present at from 2–25% by weight.

17. The aqueous polymer dispersion of claim 16, wherein copolymer A is present at from 25 to 45% by weight and copolymer B is present at from 55 to 75% by weight.

18. The process of claim 2, wherein the polymerization is carried out at from 80° to 130° C. in the presence of 0.5 to 3% by weight, based on the sum of the monomers, of free radical initiators.

19. The process of claim 2, wherein copolymer (A)'s components are polymerized to more than 95% before copolymer (B)'s components are polymerized.

20. The process of claim 2, wherein excess solvent is distilled off from the dispersion before the polyhydrazides (C) are added to the mixture.

* * * * *

UNITED STATES PATENT AND TRADEMARK OFFICE
CERTIFICATE OF CORRECTION

PATENT NO. : 4,931,494

DATED : June 5, 1990

INVENTOR(S) : Gerhard AUCHTER et al.

It is certified that error appears in the above-identified patent and that said Letters Patent is hereby corrected as shown below:

Column 7, line 39
"in" should read --a--

Column 8, line 19-20
"producecd" should read --produced--

Signed and Sealed this

Sixteenth Day of July, 1991

Attest:

HARRY F. MANBECK, JR.

Attesting Officer      Commissioner of Patents and Trademarks